US012663798B2

(12) United States Patent
Ermanoski

(10) Patent No.: US 12,663,798 B2
(45) Date of Patent: Jun. 23, 2026

(54) UNMANNED AERIAL VEHICLE FOR LOW-PRESSURE HYDROGEN TRANSPORT

(71) Applicant: Ivan Ermanoski, Tempe, AZ (US)

(72) Inventor: Ivan Ermanoski, Tempe, AZ (US)

(73) Assignee: ARIZONA BOARD OF REGENTS ON BEHALF OF ARIZONA STATE UNIVERSITY, Scottsdale, AZ (US)

( * ) Notice: Subject to any disclaimer, the term of this patent is extended or adjusted under 35 U.S.C. 154(b) by 0 days.

(21) Appl. No.: 18/773,469

(22) Filed: Jul. 15, 2024

(65) Prior Publication Data

US 2024/0367789 A1 Nov. 7, 2024

Related U.S. Application Data

(60) Continuation of application No. 18/129,827, filed on Mar. 31, 2023, now Pat. No. 12,037,113, which is a
(Continued)

(51) Int. Cl.
*B64C 29/02* (2006.01)
*B64C 3/10* (2006.01)
(Continued)

(52) U.S. Cl.
CPC .............. *G05D 1/102* (2013.01); *B64C 3/10* (2013.01); *B64C 11/46* (2013.01); *B64C 29/02* (2013.01);
(Continued)

(58) Field of Classification Search
CPC ......... B64C 29/02; B64C 39/068; B64C 3/34; B64D 2041/005; B64D 37/04; B64D 37/30; B64D 37/02; B64U 10/20
See application file for complete search history.

(56) References Cited

U.S. PATENT DOCUMENTS 9,778,653 B1 * 10/2017 McClintock ........... G06Q 10/08
2008/0006743 A1 * 1/2008 Miller .................... B64U 10/25
244/53 R
(Continued)

OTHER PUBLICATIONS

Swarnkar et al., American Institute of Aeronautics and Astronautics, Biplane-Quadrotor Tail-Sitter UAV: Flight Dynamics & Control, FIGS. 1-3 (Year: 2018).*

*Primary Examiner* — Timothy D Collins
*Assistant Examiner* — Terri L Filosi
(74) *Attorney, Agent, or Firm* — Fuller IP Law LLC; Rodney J. Fuller

(57) ABSTRACT

An unmanned aerial vehicle (UAV) for gas transport is disclosed. The UAV includes a fuselage enclosing a volume, and a gas reservoir enclosed within the fuselage, filling at least a majority of the volume. The gas reservoir is configured to receive and store a gas at a pressure no greater than 100 bar. The UAV also includes a propulsion system having at least one engine, each of the at least one engine coupled to a prop that is driven by the at least one engine using energy derived from the gas stored in the gas reservoir. The UAV also includes a control system communicatively coupled to the propulsion system and configured to operate the unmanned aerial vehicle to autonomously transport the gas. The UAV may have a footprint while on the ground, and the footprint of the UAV may be no larger than three standard parking spaces.

18 Claims, 8 Drawing Sheets

Related U.S. Application Data division of application No. 17/115,677, filed on Dec. 8, 2020, now Pat. No. 11,643,204.

(60) Provisional application No. 62/945,688, filed on Dec. 9, 2019.

(51) Int. Cl.

| | |
|---|---|
| *B64C 11/46* | (2006.01) |
| *B64C 39/02* | (2023.01) |
| *B64D 9/00* | (2006.01) |
| *B64D 41/00* | (2006.01) |
| *B64U 10/20* | (2023.01) |
| *B64U 30/10* | (2023.01) |
| *B64U 50/10* | (2023.01) |
| *B64U 101/60* | (2023.01) |
| *G05D 1/00* | (2006.01) |
| *G05D 1/46* | (2024.01) |

(52) U.S. Cl.
CPC .............. *B64C 39/024* (2013.01); *B64D 9/00* (2013.01); *B64U 10/20* (2023.01); *B64U 30/10* (2023.01); *B64U 50/10* (2023.01); *G05D 1/46* (2024.01); *B64D 2041/005* (2013.01); *B64U 2101/60* (2023.01)

(56) References Cited

U.S. PATENT DOCUMENTS

| | | | | |
|---|---|---|---|---|
| 2012/0012692 A1* | 1/2012 | Kroo | ................... | B64C 29/0025 244/6 |
| 2017/0320570 A1* | 11/2017 | Horn | ........................ | G08G 5/22 |
| 2021/0245875 A1* | 8/2021 | Bianco Mengotti | .... | B64C 29/02 |
| 2022/0250762 A1* | 8/2022 | Sperrin | ................. | B64D 37/30 |

* cited by examiner

UNMANNED AERIAL VEHICLE FOR LOW-PRESSURE HYDROGEN TRANSPORT

RELATED APPLICATIONS

This application is a Continuation of U.S. patent application Ser. No. 18/129,827, filed Mar. 31, 2023, which is a Divisional of U.S. patent application Ser. No. 17/115,677, filed Dec. 8, 2020 and issued as U.S. Pat. No. 11,643,204, which claims the benefit of U.S. Provisional Patent Application No. 62/945,688, filed Dec. 9, 2019, titled "Unmanned Aerial Vehicle for Low-Pressure Hydrogen Transport," the contents of each of which are incorporated herein by reference in their entireties.

TECHNICAL FIELD

Aspects of this document relate generally to an unmanned aerial vehicle for low-pressure hydrogen transport.

BACKGROUND

Although technologies that make use of hydrogen, such as fuel cells, continue to advance, and the appetite for energy sources continues to grow, the use of hydrogen is not widespread. One reason for the slow adoption of hydrogen as a fuel source is economics. Conventional methods of transporting hydrogen come with constraints that significantly increase the cost, making hydrogen too expensive for many applications.

Hydrogen transmission and delivery is largely limited to relatively short distances in the petroleum and chemical industries. Longer distance transport is still not well-developed. Present research efforts in this area are primarily focused on improvements in conventional modes of transport: pipelines, and gas or liquid tube trailer transport by truck or ship. Efforts are also being made in the area of converting hydrogen to a liquid carrier chemical for transport using these methods or liquefied shipping, and then reconverting to hydrogen at the destination.

The common approach in traditional hydrogen transportation methods is to take hydrogen, the least dense of all gasses, and to substantially densify it so it can economically fit into existing transportation modes. Densification is achieved by compression (e.g. compression to 70-700 bar), by liquefaction (e.g. cooling below −253° C.), and/or by chemical conversion.

This often means a substantial investment in infrastructure is required. Not only does the transport require construction of a pipeline or the existence of a highway, the endpoints of a traditional hydrogen transport chain require specialized facilities at one or both endpoints, to compress, liquefy, and/or chemically convert the hydrogen before and/or after transport. This represents an additional cost above and beyond the investment required for conventional petroleum-based combustible fuel, or other alternatives that hydrogen competes against. These infrastructure requirements mean that establishing a new hydrogen supply chain can require a large investment in time and resources.

SUMMARY

According to one aspect, an unmanned aerial vehicle (UAV) for gas transport includes an airframe having a fuselage and a box wing. The fuselage is an airfoil enclosing a volume, wider than long, pointed upward while the UAV is on the ground, and pointed forward when the UAV is flying. The UAV also includes a gas reservoir having a plurality of tanks in fluid communication and enclosed within the fuselage, filling at least a majority of the volume. The gas reservoir is configured to receive and store a gas at a pressure no greater than 30 bar. The gas is hydrogen gas. The UAV also includes a propulsion system including a power generator and at least one engine, each of the at least one engines coupled to a prop that is driven by the at least one engine using electricity generated by the power generator from the gas stored in the gas reservoir. The power generator is in fluid communication with the gas reservoir and communicatively coupled to the at least one engine. Each prop has a rotational axis. The UAV further includes a control system communicatively coupled to the propulsion system and configured to operate the unmanned aerial vehicle to autonomously transport the hydrogen gas. The UAV is a vertical take-off and landing (VTOL) aircraft. The UAV has a footprint, while on the ground, that is no larger than three standard parking spaces. The box wing serves as the undercarriage of the UAV when the UAV is on the ground. All prop rotational axes are parallel and fixed with respect to the fuselage.

Particular embodiments may comprise one or more of the following features. The UAV may further include a gas interface for placing the gas reservoir in fluid communication with at least one of a user-end equipment and an on-site storage while the UAV is on the ground. The power generator may be communicatively coupled to an external electrical interface configured to provide electricity generated from the gas within the gas reservoir while the UAV is on the ground. The power generator may be a hydrogen-powered fuel cell. The gas reservoir may fill at least 85% of the volume of the fuselage.

According to another aspect of the disclosure, an unmanned aerial vehicle (UAV) for gas transport includes an airframe having a fuselage enclosing a volume, and a gas reservoir enclosed within the fuselage, filling at least a majority of the volume. The gas reservoir is configured to receive and store a gas at a pressure no greater than 100 bar. The UAV also includes a propulsion system having at least one engine, each of the at least one engine coupled to a prop that is driven by the at least one engine using energy derived from the gas stored in the gas reservoir. Each prop has a rotational axis. The UAV further includes a control system communicatively coupled to the propulsion system and configured to operate the unmanned aerial vehicle to autonomously transport the gas.

Particular embodiments may comprise one or more of the following features. The UAV may further include a gas interface for placing the gas reservoir in fluid communication with at least one of a user-end equipment and an on-site storage while the UAV is on the ground. The UAV may further include a power generator in fluid communication with the gas reservoir and communicatively coupled to the at least one engine, the power generator providing electricity generated from the gas to the at least one engine. The power generator may be communicatively coupled to an external electrical interface configured to provide electricity generated from the gas within the gas reservoir while the UAV is on the ground. The power generator may be a hydrogen-powered fuel cell. The pressure of the gas within the gas reservoir may be no greater than 30 bar. The gas reservoir may include a plurality of tanks in fluid communication. The gas reservoir may fill at least 85% of the volume of the fuselage. The gas reservoir may have the capacity to hold at least 100 kg of hydrogen gas. The UAV may be a vertical take-off and landing (VTOL) aircraft. The UAV may have a footprint while on the ground, and the footprint of the UAV may be no larger than three standard parking spaces. All prop rotational axes may be parallel and/or fixed with respect to the fuselage. The fuselage may be an airfoil. The fuselage may be pointed upward while the UAV is on the ground, and may be pointed forward when the UAV is flying. The fuselage may be wider than it is long. The airframe may further include a box wing, and the box wing may serve as the undercarriage of the UAV when the UAV is on the ground.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112(f). Moreover, even if the provisions of 35 U.S.C. § 112(f) are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The disclosure will hereinafter be described in conjunction with the appended drawings, where like designations denote like elements, and.

DETAILED DESCRIPTION

Figure 1:
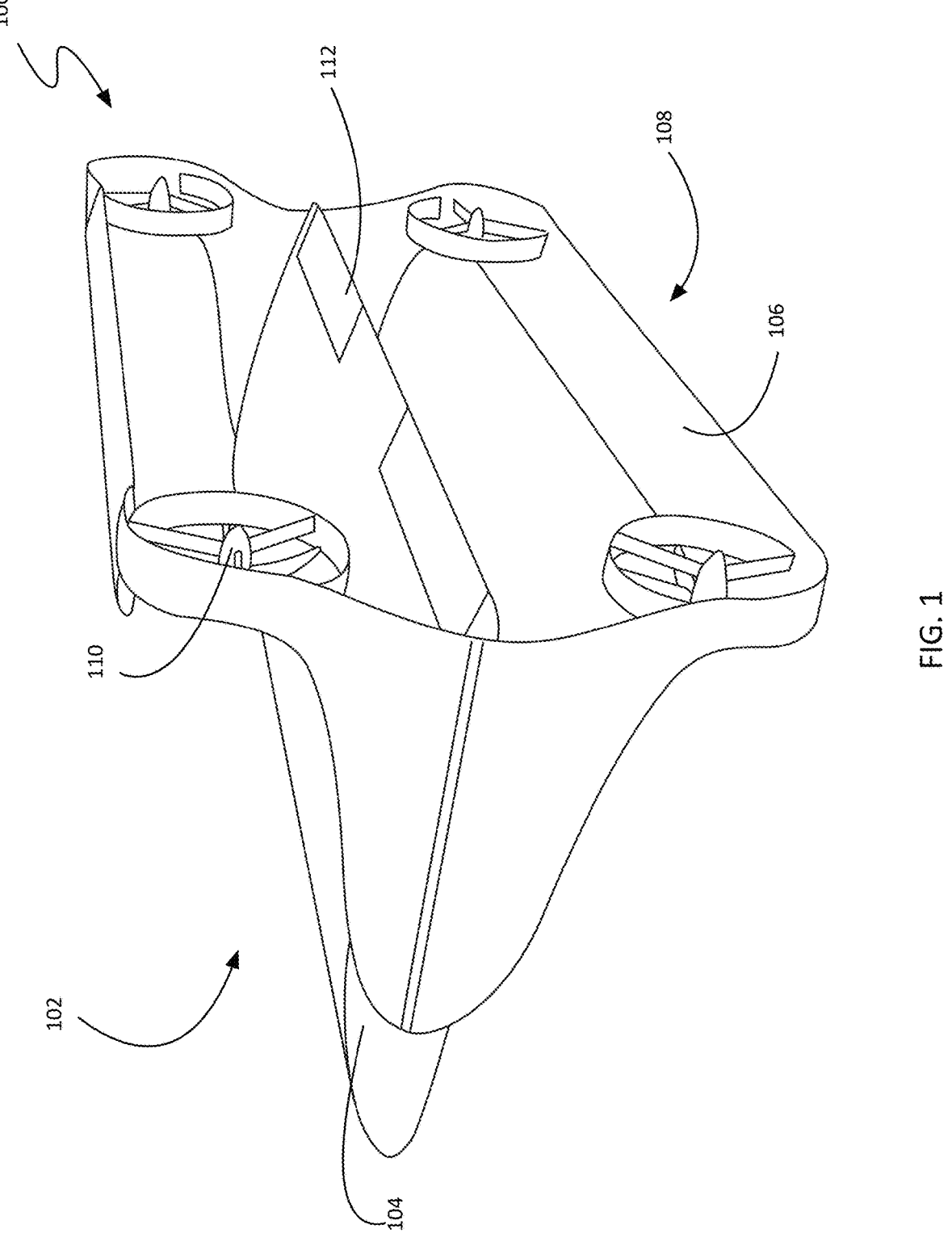
FIG. 1 is a perspective view of a $H_2UAV$ 100 in flight.

This disclosure, its aspects and implementations, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

While this disclosure includes a number of embodiments in many different forms, there is shown in the drawings and will herein be described in detail particular embodiments with the understanding that the present disclosure is to be considered as an exemplification of the principles of the disclosed methods and systems, and is not intended to limit the broad aspect of the disclosed concepts to the embodiments illustrated.

Although technologies that make use of hydrogen, such as fuel cells, continue to advance, and the appetite for energy sources continues to grow, the use of hydrogen is not widespread. One reason for the slow adoption of hydrogen as a fuel source is economics. Conventional methods of transporting hydrogen come with constraints that significantly increase the cost, making hydrogen too expensive for many applications.

Hydrogen transmission and delivery is largely limited to relatively short distances in the petroleum and chemical industries. Longer distance transport is still not well-developed. Present research efforts in this area are primarily focused on improvements in conventional modes of transport: pipelines, and gas or liquid tube trailer transport by truck or ship. Efforts are also being made in the area of converting hydrogen to a liquid carrier chemical for transport using these methods or liquefied shipping, and then reconverting to hydrogen at the destination.

The common approach in traditional hydrogen transportation methods is to take hydrogen, the least dense of all gasses, and to substantially densify it so it can economically fit into existing transportation modes. Densification is achieved by compression (e.g. compression to 70-700 bar), by liquefaction (e.g. cooling below −253° C.), and/or by chemical conversion.

This often means a substantial investment in infrastructure is required. Not only does the transport require construction of a pipeline or the existence of a highway, the endpoints of a traditional hydrogen transport chain require specialized facilities at one or both endpoints, to compress, liquefy, and/or chemically convert the hydrogen before and/or after transport. This represents an additional cost above and beyond the investment required for conventional petroleum-based combustible fuel, or other alternatives that hydrogen competes against. These infrastructure requirements mean that establishing a new hydrogen supply chain can require a large investment in time and resources.

Contemplated herein is an unmanned aerial vehicle for transporting comparatively low-pressure hydrogen. The unmanned aerial vehicle for hydrogen transport (hereinafter $H_2UAV$) disclosed herein transports hydrogen by air, with much less densification, which stands in contrast to conventional methods of ground-based transport of highly densified hydrogen. The $H_2UAV$ facilitates the transportation of hydrogen at a lower cost than conventional methods, without facing the barriers that have held back hydrogen adoption in the past. For example, unlike conventional methods that are constrained to transportation endpoints dictated by the location of ports, depots, roads, and/or pipelines, a $H_2UAV$ can be redirected for use in virtually any location, including locations that are not realistically feasible with conventional methods. This flexibility also means the $H_2UAV$ does not require a costly and slow infrastructure to operate. Additionally, the $H_2UAV$ 100 can easily be redirected to a new destination, providing a flexibility impossible using conventional systems. If a sudden need arose (e.g. natural disaster has disrupted normal supply lines or infrastructure, etc.), the $H_2UAV$ 100 can be used to quickly provide needed resources, as will be discussed in greater detail, below.

Transporting hydrogen in a relatively low-pressure, gaseous state using a UAV is advantageous over the transport of hydrogen using manned aircraft while in states common to conventional transport (e.g. high pressure, liquefied, as a liquid carrier chemical, etc.) for a number of reasons. The unmanned, autonomous nature of the $H_2UAV$ reduces the cost of operation, and makes it easier to scale than a manned aircraft-based operation. Additionally, transport of hydrogen at low-pressure does not present the complications of transporting high pressure tanks at flight altitudes, nor the inefficiencies inherent to solutions that prevent dangerous weight shifts when transporting a liquid, particularly cryogenic liquid, in an aircraft.

The $H_2UAV$ substantially reduces the infrastructure and other capital costs related to hydrogen transport, as well as operational costs, via decreased labor requirements and high payload ratios. Unlike pipelines and road trailers, the $H_2UAV$ requires infrastructure only at the origin and destination. Depending on the chosen $H_2UAV$ size, even endpoint infrastructure can be modest or minimal. A $H_2UAV$-based supply chain can be put into operation quickly compared to conventional systems, deploying as individual vehicles are built and put into service. Additionally, compared with chemically bound hydrogen for overseas shipping, $H_2UAV$ eliminates the need for two chemical conversions (at origin and destination), the associated infrastructure, and additional energy requirements.

The $H_2UAV$'s minimal infrastructure requirements can open up otherwise non-existing markets for hydrogen. For example, long distance or overseas transport, or transport from/to temporary or remote locations using conventional methods is not readily made economically efficient. The use of the $H_2UAV$ contemplated herein, on the other hand, is not constrained to coastal operation or existing roads, and essentially eliminates any right-of-way issues. According to various embodiments, the operation of the $H_2UAV$ is effectively unlimited, geographically.

The $H_2UAV$ is also advantageous over conventional transport methods because it has a high payload ratio. Depending on the operating pressure, the $H_2UAV$ payload fraction (i.e. the weight of the payload divided by the takeoff weight of the aircraft) can be between 25% and 50%. This is in stark contrast to compressed gas and liquefied gas trailers, which are expected to eventually achieve a 5% and 15% payload ratio, but are currently at roughly 2% and 12%, respectively. Some embodiments of the $H_2UAV$ may be implemented with much lower capital costs than trailers, per unit carrying capacity. Furthermore, unlike large capital/infrastructure projects, $H_2UAV$ can benefit from economies of mass production, where relatively small units are produced in large numbers, and also where units of different sizes are produced from the same set of basic parts.

It should be noted that while this disclosure is focused on the use of the $H_2UAV$ 100 for the transportation of hydrogen, those skilled in the art will recognize that it may be adapted for use in transporting other gases. Furthermore, while some embodiments of the $H_2UAV$ 100 are fueled by the very gas that is being transported, other embodiments may be adapted for use in transporting gases that are not viable fuels, either physically or economically. Alternative power sources will be discussed below.

Figure 2:
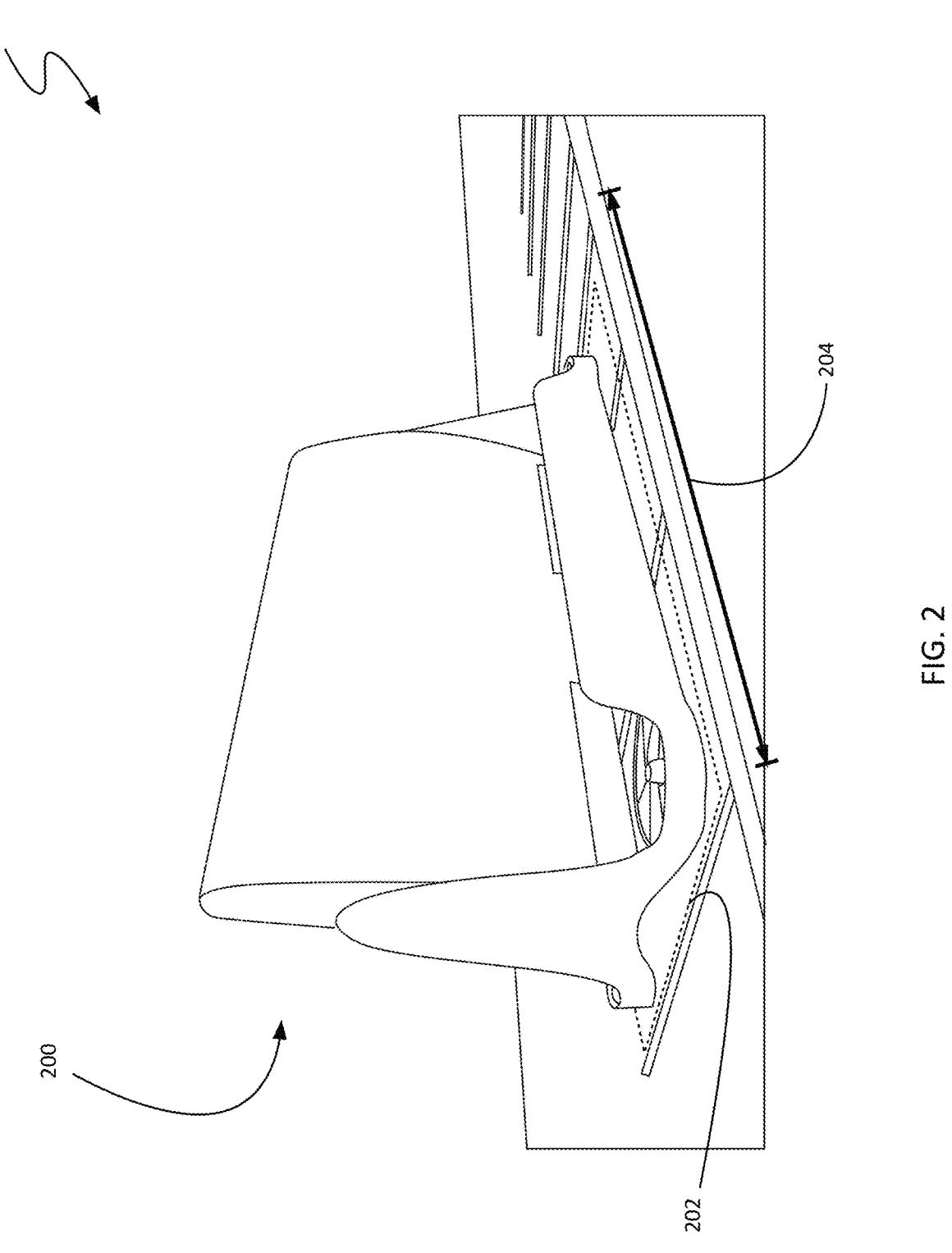
FIG. 2 is a perspective view of the $H_2UAV$ 100 of FIG. 1, on the ground.

FIGS. 1 and 2 are perspective views of a non-limiting example of a $H_2UAV$ 100, in flight and on the ground, respectively. As shown, the $H_2UAV$ 100 comprises an airframe 102 that includes a fuselage 104 enclosing a volume, and at least one wing 106. The non-limiting example shown in FIG. 1 is propelled by a plurality of props 110, driven by engines. The engines will be discussed further with respect to FIG. 4, below.

The shape of the fuselage 104 and overall architecture of the $H_2UAV$ 100 will vary from embodiment to embodiment, depending on the intended application. For example, an embodiment intended for use in transporting hydrogen to be delivered in an urban area may be a vertical take-off and landing (VTOL) aircraft 200. The use of a VTOL aircraft 200 is advantageous in an urban environment, where a traditional, horizontal landing might not be possible at a location close to the final destination. Some embodiments intended for urban delivery may resemble a ground vehicle more than a traditional airplane, at least with respect to the footprint 202, allowing the $H_2UAV$ 100 to go places originally intended for automobiles.

On the other hand, embodiments intended for long distance transportation, where having to land a distance from the ultimate destination does not introduce so great an expense to render the endeavor impractical, the H₂UAV 100 may more closely resemble a traditional aircraft, which tends to be more efficient. For example, in some embodiments, a H₂UAV 100 intended for overseas journeys may have a blended wing geometry. Some long distance embodiments may be VTOL 200 aircraft, while others may land horizontally on a runway or other long stretch of space. Those skilled in the art will recognize that a wide range of fuselage 104 geometries may be used, depending on the circumstances (e.g. stability in inclement weather for use in certain climates, etc.).

The shape of the fuselage 104 of the non-limiting example shown in FIGS. 1 and 2 is geared towards an efficient use of space in a VTOL aircraft 200 intended for use in a cramped urban area originally designed for ground vehicles and the like, rather than traditional runways used by fixed wing aircraft. According to various embodiments, the fuselage 104 is an airfoil, meaning it has a cross-sectional shape of a wing or blade that results in the production of an aerodynamic force when moving through a fluid. As shown, in some embodiments, the fuselage 104 may comprise one or more control surfaces 112. By maximizing the number of elements on the H₂UAV 100 that act as lifting surfaces, the H₂UAV 100 is able to carry meaningful payloads without requiring a great deal of space.

Most VTOL aircraft 200 tend to maintain (roughly) their orientation with respect to gravity, whether in flight or while on the ground. While this makes for a much more comfortable ride for a pilot or passengers, and minimizes the shift of solid payloads, it is a feature that is not necessary when the payload is a gas. According to various embodiments, the fuselage 104 is pointed upward while the H₂UAV 100 is on the ground, and is pointed forward when the H₂UAV 100 is flying. In the context of the present description and the claims that follow, the direction of the fuselage 104 is the direction of motion after the aircraft has taken off, and before it has begun landing. Put differently, the direction of the fuselage 104 may be thought of as roughly the same direction of the average vector pointing from the trailing edge to the leading edge of the wings 106 (e.g. tail to nose, etc.).

In some embodiments, including the non-limiting example shown in FIGS. 1 and 2, the H₂UAV 100 may have a tail-sitting triplane geometry, having a fuselage 104 that is an airfoil, and employing a structure at the aft end of the aircraft on which the H₂UAV 100 sits when on the ground. As shown, in some embodiments, the H₂UAV 100 may comprise a box wing 108, which serves as the undercarriage (i.e. the part of the aircraft that is underneath the main body when at rest, such as landing gear of an airplane or landing skids of a helicopter) of the H₂UAV 100 when the H₂UAV 100 is on the ground. This results in a H₂UAV 100 that has a small footprint 202, without sacrificing lifting power or payload capacity. As a specific example, in one embodiment, the H₂UAV 100 may be sized and shaped such that it can deliver a 100 kg payload of hydrogen gas at 100 bar delivery pressure, within a 100 mile range moving at up to 100 kn airspeed, and then land vertically, taking up a footprint 202 no bigger than three standard parking spaces 204. Such an embodiment would be well adapted for delivery of hydrogen to gas stations in urban areas, for use in hydrogen-powered vehicles, without requiring a drastic restructuring of the premises. The delivery could be made using the preexisting parking lot of the station, with less disruption than is caused when gasoline deliveries are made using tanker semitrucks.

Taking off, the H₂UAV 100 would follow a trajectory closer to a rocket than a helicopter, being thrust upward by the props 110 and then gradually tilting towards horizontal to use that same thrust for forward motion and the resulting lifting force. Since the payload is a gas that is always evenly distributed, such a drastic reorientation is not problematic as it would be if the gas was being transported in a cryogenic or chemical liquid state.

Other embodiments of the H₂UAV 100 may resemble more traditional VTOL aircraft 200, with sources of thrust that are movable and/or directed in different directions (e.g. pusher props combined with lift props, etc.). This will be discussed further with respect to FIGS. 6 and 7, below.

Figure 3:
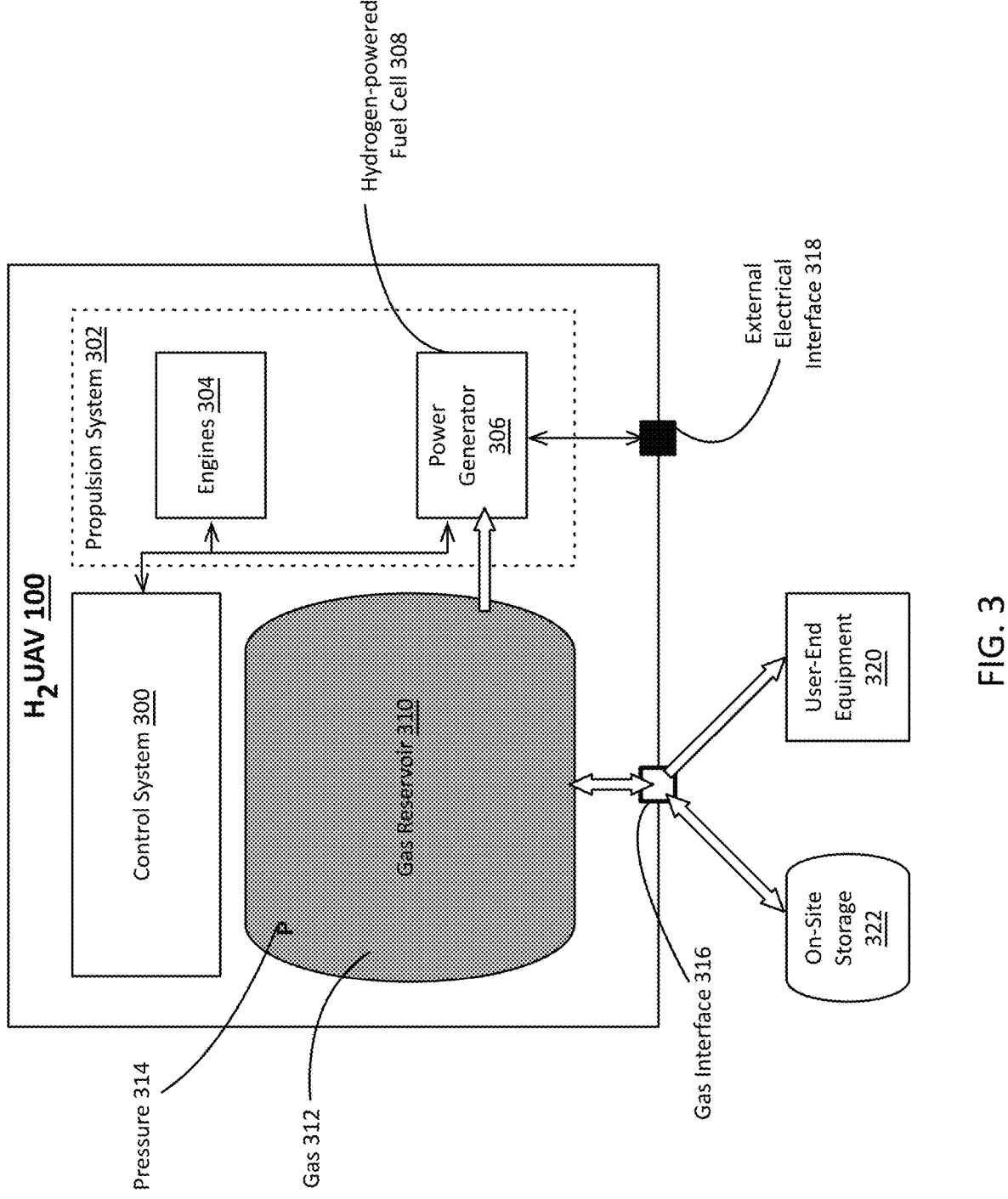
FIG. 3 is a schematic view of a $H_2UAV$ 100.

FIG. 3 is a schematic view of a non-limiting example of a H₂UAV 100. As shown, the H₂UAV 100 comprises a control system 300, a propulsion system 302, and a gas reservoir 310. In some embodiments, the gas reservoir 310 is enclosed within the fuselage 104, while in other embodiments, some or all of the gas reservoir 310 may be outside the fuselage 104 (e.g. attached to the wings 106, etc.).

The H₂UAV 100 may be implemented using various propulsion methods. For example, in some embodiments, including the non-limiting example shown in FIGS. 1 and 2, the H₂UAV 100 may be propelled using props 110 driven by engines 304. Those skilled in the art will recognize that the H₂UAV 100 may be implemented in a number of different aircraft styles, using various propulsion methods known in the art, some of which may be advantageous over others depending on the needs and limits of particular use cases.

According to various embodiments, the H₂UAV 100 may be powered by drawing fuel from the gas reservoir 310. In some embodiments, the gas 312 may be used directly as fuel within the engines 304. In other embodiments, including the non-limiting example depicted in FIG. 3, the gas 312 may be converted into energy (e.g. electricity) by a power generator 306. The energy is then sent to the engines 304. As shown, the power generator 306 is in fluid communication with the gas reservoir 310 and communicatively coupled to the engines 304 as well as the control system 300. As a specific example, the hydrogen may be used in conjunction with one or more hydrogen fuel cells 308. In still other embodiments, the hydrogen may be utilized in any other method known in the art.

In other embodiments, the H₂UAV 100 may be powered by batteries, which may be charged from one or more sources including, but not limited to, charging from a ground station, on-board photovoltaics, one or more hydrogen or other type of fuel cells, thermoelectric generators, and the like. In still other embodiments, the H₂UAV 100 may be combustion driven. Also, some embodiments may make use of multiple propulsion and or power systems.

The H₂UAV 100 is unmanned, and comprises a control system 300 that is communicatively coupled to the propulsion system 302. In some embodiments, the H₂UAV 100 may piloted remotely by a human operator. In other embodiments, the H₂UAV 100 may be configured to operate semi-autonomously, relying on the intervention of a human operator for piloting during particular events (e.g. takeoff, landing, equipment failure, inclement weather, etc.) or when in certain locations, as dictated by the limitations of automation technology and/or regulations regarding operation of unmanned aerial vehicles (e.g. flying over residential areas vs. operating over wilderness, etc.). In still other embodiments, the H₂UAV 100 may operate entirely autonomously. As an option, in some embodiments, the acquisition and/or delivery of the hydrogen payload may also be performed autonomously, using appropriate sensors and a standardized or predictable gas interface at the source and destination. The control system 300 may also include other devices common to UAVs or other aircraft including, but not limited to, transponders, recorders, sensors (e.g. sensors to monitor the operation of the aircraft, sensors to monitor the gas reservoir 310 in transit and while transacting with an external gas source or receiver, etc.), satellite navigation receivers, telemetry equipment, and other avionics known in the art.

The H₂UAV 100 comprises a gas reservoir 310. In the context of the present description and the claims that follow, a gas reservoir 310 is a structure capable of storing a gas 312 during transit. In some embodiments, the gas reservoir 310 may be a single, enclosed void (e.g. a large tank, the sealed interior of the fuselage, etc.), while in other embodiments the gas reservoir 310 may comprise a plurality of vessels able to contain the gas 312 during transit, which may be in fluid communication with each other. As a specific example, some embodiments of H₂UAV 100 employ a plurality of tanks that operate together as a gas reservoir 310, as will be discussed with respect to FIG. 5, below.

In the context of the present description, low-pressure hydrogen refers to low pressure as compared to the pressures used in conventional transportation methods. For example, conventional gas tube trailers presently operate at roughly 250 bar, and are targeted to be up to 500 bar in the Department of Energy's FCTO Multi-Year Research, Development, and Demonstration Plan. According to some embodiments, the H₂UAV 100 is configured to transport hydrogen at pressures an order of magnitude lower. In some embodiments, the transport pressure of a H₂UAV 100 does not exceed 30 bar. It should be noted that the use of the term "low-pressure" to describe hydrogen in the present disclosure should not be interpreted to describe a pressure lower than atmospheric pressure. The hydrogen transported by the various embodiments of the H₂UAV 100 is still a pressurized gas.

In some embodiments, the pressure 314 within the gas reservoir 310 may be 30 bar or lower. However, in use cases where overall volume and size of the H₂UAV 100 are a concern (e.g. urban deliveries, etc.), the pressure 314 may be higher. For example, in one embodiment, the pressure 314 of the gas 312 may be 100 bar. In another embodiment, pressure 314 may be as high as 120 bar. However, in these embodiments, the pressure 314 of the gas reservoir 310 is still much lower than the pressures employed in conventional systems, and are kept outside the regime where expensive (e.g. monetary, energy, time, etc.) processes are required to prepare the gas 312 for transit, and then prepare it for use. This is one of the numerous advantages the H₂UAV 100 contemplated herein has over conventional gas transportation technologies.

As shown, the H₂UAV 100 comprises at least one gas interface 316. In the context of the present description and the claims that follow, a gas interface 316 is a mechanism through which gas 312 may be stored within and extracted from, the gas reservoir 310. As shown, it is in fluid communication with the gas reservoir 310. In some embodiments, the gas interface 316 may be as simple as a valve or a standardized attachment point where hoses can be coupled to connect the gas reservoir 310 to a source or a destination. In other embodiments, the gas interface 316 may be a complicated mechanism comprising elements that allow the H₂UAV 100 to autonomously, or semi-autonomously, couple with a gas supply to receive and/or dispense gas 312 with little to no human interaction. The gas interface 316 may include articulated arms, cameras, LIDAR, machine vision processors, and the like.

According to various embodiments, the H₂UAV 100 may be applied in a wide range of use cases. In many of the contemplated use cases, the H₂UAV 100 may couple with on-site storage 322 through the gas interface 316 to either refuel the storage or receive a gas payload to be delivered to another location. In some embodiments, the gas interface 316 may directly refuel end-user equipment such as on-site equipment, power generators, vehicles, and the like, without having to pass the delivered gas 312 through an on-site storage 322. In some embodiments, the same gas interface 316 may be used to couple with on-site storage 322 as well as end-user equipment 320, while in other embodiments, the H₂UAV 100 may comprise multiple gas interfaces 316 which may be configured for different uses or integrations.

In some embodiments, the H₂UAV 100 may comprise an external electrical interface 318. One of the many use cases contemplated is the use of the H₂UAV 100 to provide needed hydrogen fuel in response to a natural disaster or other devastating event. The H₂UAV 100 can rapidly respond to emergency needs. In some embodiments, the H₂UAV 100 not only is able to deliver needed fuel gas to locations in need, it may operate as a temporary on-site hydrogen storage, creating a piece of needed infrastructure the moment it drops down from the sky. In some embodiments, the H₂UAV 100 may also provide electricity generated using the on-board power generator 306 (e.g. hydrogen fuel cells, etc.). That electricity may be dispensed through the external electrical interface 318. In some embodiments, the external electrical interface may be as simple as one or more plugs adapted for use with consumer level devices such as lights, refrigerators, medical equipment, and the like. In other embodiments, an external electrical interface 318 may be more robust, able to patch the H₂UAV 100 into a pre-existing power infrastructure (e.g. the wiring of a hospital, a power grid, etc.) and provide electricity on a larger scale.

The H₂UAV 100 contemplated herein presents a safer alternative to both hydrogen trailers and pipelines. The H₂UAV 100 utilizes comparatively low-pressure tanks at ambient temperature, can mostly be operated at a distance from objects and people, and can employ time-tested safe practices and designs from the airline industry.

Many examples can be envisioned for using the H₂UAV 100 for the transport of hydrogen from points of generation, which tend to be away from urban centers, to points of use, which tend to be where the people are. One example would be the transport of hydrogen, or hydrogen containing gas mixtures, from a point of generation to a processing plant, such as from a remote biomass gasification unit to a central collection/processing plant.

Not only can the H₂UAV 100 operate efficiently in replacing conventional transport methods as presently used, the H₂UAV 100 is able to be used for applications that are inefficient or even impossible for conventional methods. One such application would be to deliver hydrogen to remote operations (e.g. mining, construction, off-grid houses or communities, etc.) to be used as a fuel, replacing or augmenting fuels more typically used in these applications, such as diesel. Another application would be in military installations, particularly in areas in which the risks and costs associated with surface fuel transport are significant. In this application, H₂UAV 100 can also offer risk mitigation by enabling the delivery of many relatively small hydrogen payloads, such that the loss of some of them can be tolerated.

On a larger and broader scale, applications might include the transportation of hydrogen from large production regions to large consumption regions. One such example would be transporting solar energy derived hydrogen from the solar rich regions of the U.S. southwest, to large population or industrial centers elsewhere in the U.S. or overseas (e.g. Japan or Europe). Another example would be the (relatively) local delivery of hydrogen from points of production or storage, to dispensing points, such as hydrogen fueling stations.

According to various embodiments, the H₂UAV 100 enables hydrogen delivery under currently technically impossible or uneconomical scenarios, significantly expanding the markets where hydrogen may potentially be used. These scenarios include ad-hoc or remote origins and destinations, high-risk locations and routes, as well as in quantities that are either too small or too variable to be realistically served by current hydrogen transport technologies. In some embodiments, payloads ranging from a few kilograms to hundreds of metric tons are feasible, so H₂UAVs 100 can be built to optimally match many different market needs. In comparison, trailer capacities are typically 1.1-5.3 metric tons.

H₂UAV 100 can serve a wide range of roles—from local/distribution, to global/transmission. Origins, destinations, and routes can be adapted quickly to fit evolving market needs, strategic shifts, or unexpected events. The H₂UAV 100 can make deliveries to remote areas more practical than conventional solutions.

Figure 4:
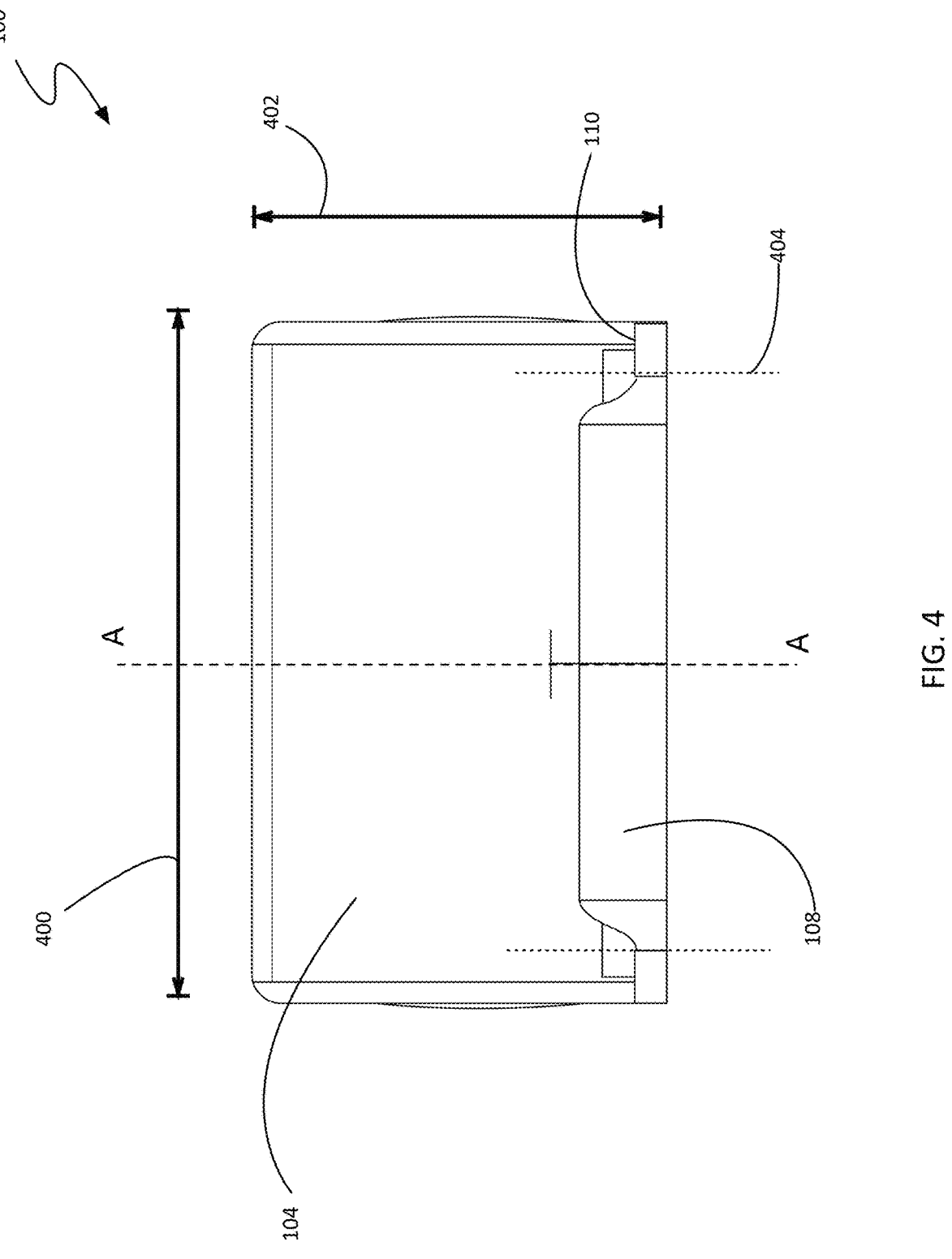
FIG. 4 is a top view of the $H_2UAV$ 100 of FIG. 1, in flight.

FIG. 4 is a top view of the H₂UAV 100 of FIG. 1, in flight. It should be noted that this could also be called a side view of the H₂UAV 100 while on the ground, if the concepts of "top" and "up" are defined relative to gravity. According to various embodiments, the fuselage 104 may have a width 400 (e.g. "wing tip to wing tip" direction) that is greater than its length 402 (e.g. "tail to nose" direction).

As previously mentioned, in some embodiments the H₂UAV 100 may be a VTOL aircraft 200. In some of these embodiments, the engines 304 and props 110 (or whatever is providing thrust) may be able to move, changing the orientation of the thrust they provide with respect to the fuselage 104. In other embodiments, they may remain fixed with respect to the fuselage 104. In some embodiments, these fixed sources of thrust may be fixedly pointing in different directions, with respect to the fuselage 104. For example, in some embodiments, the H₂UAV 100 may comprise a plurality of props 110, some providing lift, others pushing the H₂UAV 100 forward. In other embodiments, all of the thrust sources may be pointed in essentially the same direction. See, for example, the non-limiting embodiments of FIGS. 1, 2, and 4. Specifically, each prop 110 (or other thrust source) has a central rotational axis 404 about which the prop or other airfoil rotates. In some embodiments, all prop rotational axes 404 are parallel and fixed in orientation with respect to the fuselage, simplifying the construction and maintenance of the H₂UAV 100 (e.g. fewer moving parts, etc.).

Figure 5:
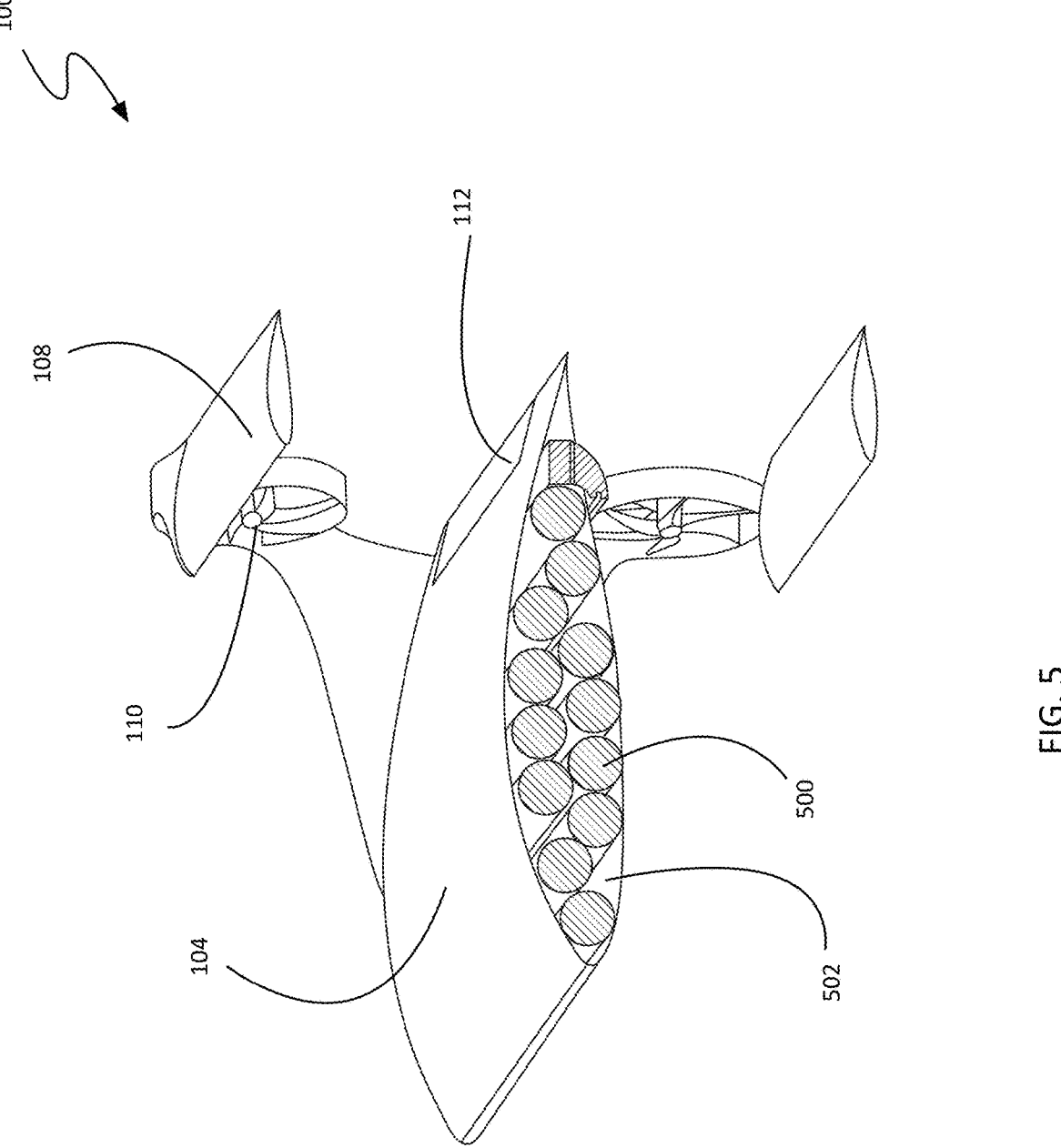
FIG. 5 is a cross-sectional view of the $H_2UAV$ 100 of FIG. 4 along A-A.

FIG. 5 is a cross-sectional view of the H₂UAV 100 of FIG. 4 taken along A-A. As shown, the fuselage 104 encloses a volume 502. According to various embodiments, the H₂UAV 100 has a fuselage 104 configured such that a large fraction (e.g. at least a majority) of the enclosed volume 502 is taken up by the gas reservoir 310. In some embodiments, at least 85% of the volume 502 of the fuselage 104 is filled with the gas reservoir 310.

In some embodiments, a large fraction of the volume 502 is filled with low-pressure hydrogen tanks 500. In other embodiments, a large fraction of the aircraft fuselage 104 is sealed such that it may act as a vessel and contain the low-pressure hydrogen. For example, some embodiments may comprise a fuselage 104 designed to take advantage of the reduced design constraints inherent to transporting a low-pressure gas, whose weight always remains evenly distributed and which can take advantage of even the smallest, oddly shaped crevice of a containing volume. Using the fuselage 104 as a storage reservoir is advantageous, as it can be designed for greater storage volume and aerodynamic efficiency because it is not required to hold the shapes of gas tanks or cargo containers. In other embodiments, the airframe may be designed for use with low-pressure hydrogen tanks. In still other embodiments, the H₂UAV 100 may comprise a commercially available, off-the-shelf airframe, fitted with storage tanks 500, which may be located within the fuselage 104, or outside of the H₂UAV 100 (e.g. attached to the wings, etc.).

Figure 6:
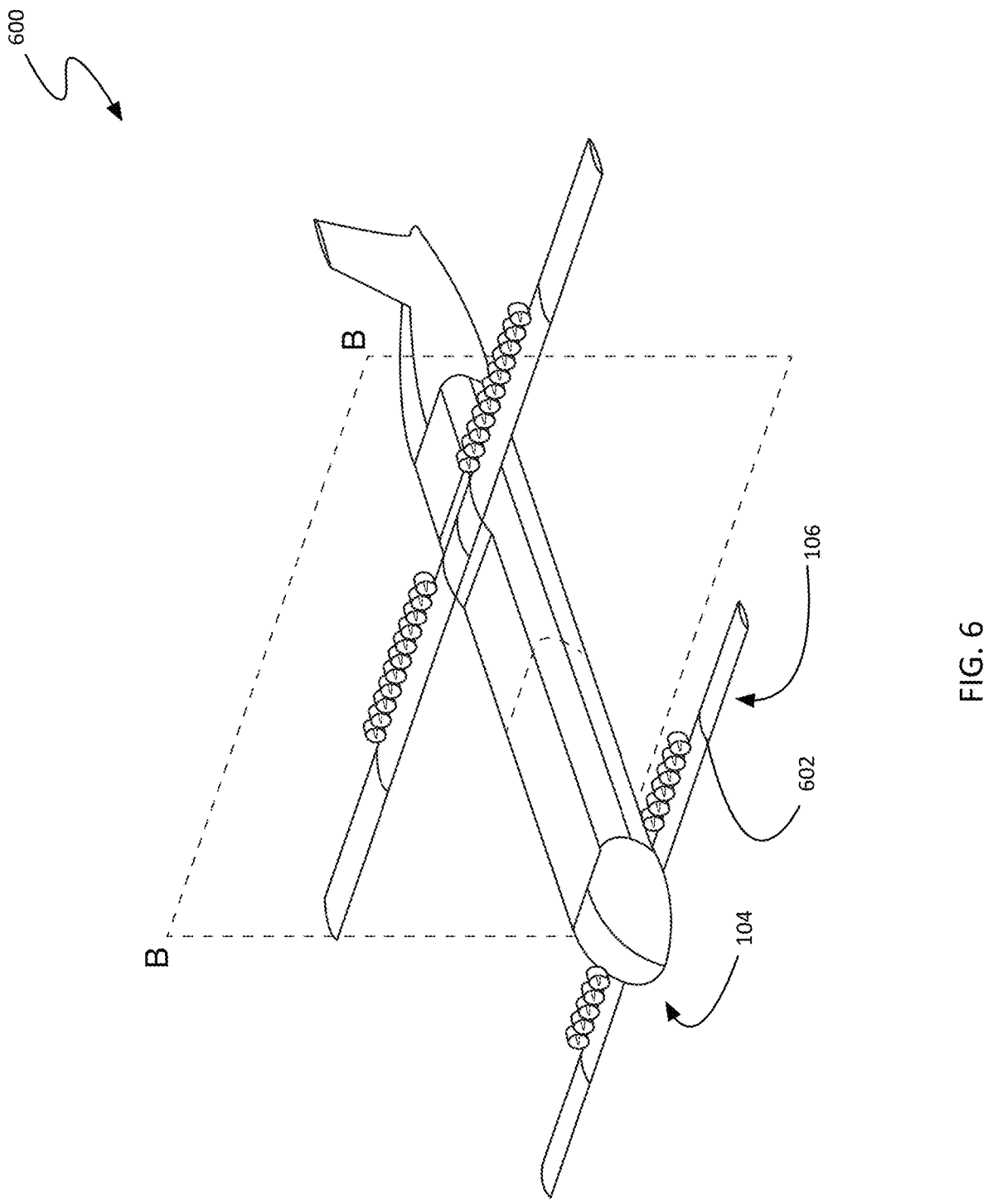
FIG. 6 is a perspective view of another embodiment of a $H_2UAV$ 100.

FIG. 6 is a perspective view of a non-limiting example of a H₂UAV 600, according to another embodiment. This non-limiting example of an H₂UAV 600 is a VTOL aircraft 200 having a slightly more traditional design. As shown, the wings 106 may each comprise a wing hinge 602, reducing the footprint 202 of the H₂UAV 600 while on the ground. The wings 106 may be extended once the H₂UAV 600 is in the air, providing stability and lift for forward flight. The lift may be provided by rotatable engines, or, in some embodiments, rotating wings. Those skilled in the art will recognize that other folded-wing plane designs may be adapted for use with the H₂UAV 600 contemplated herein.

Figure 7:
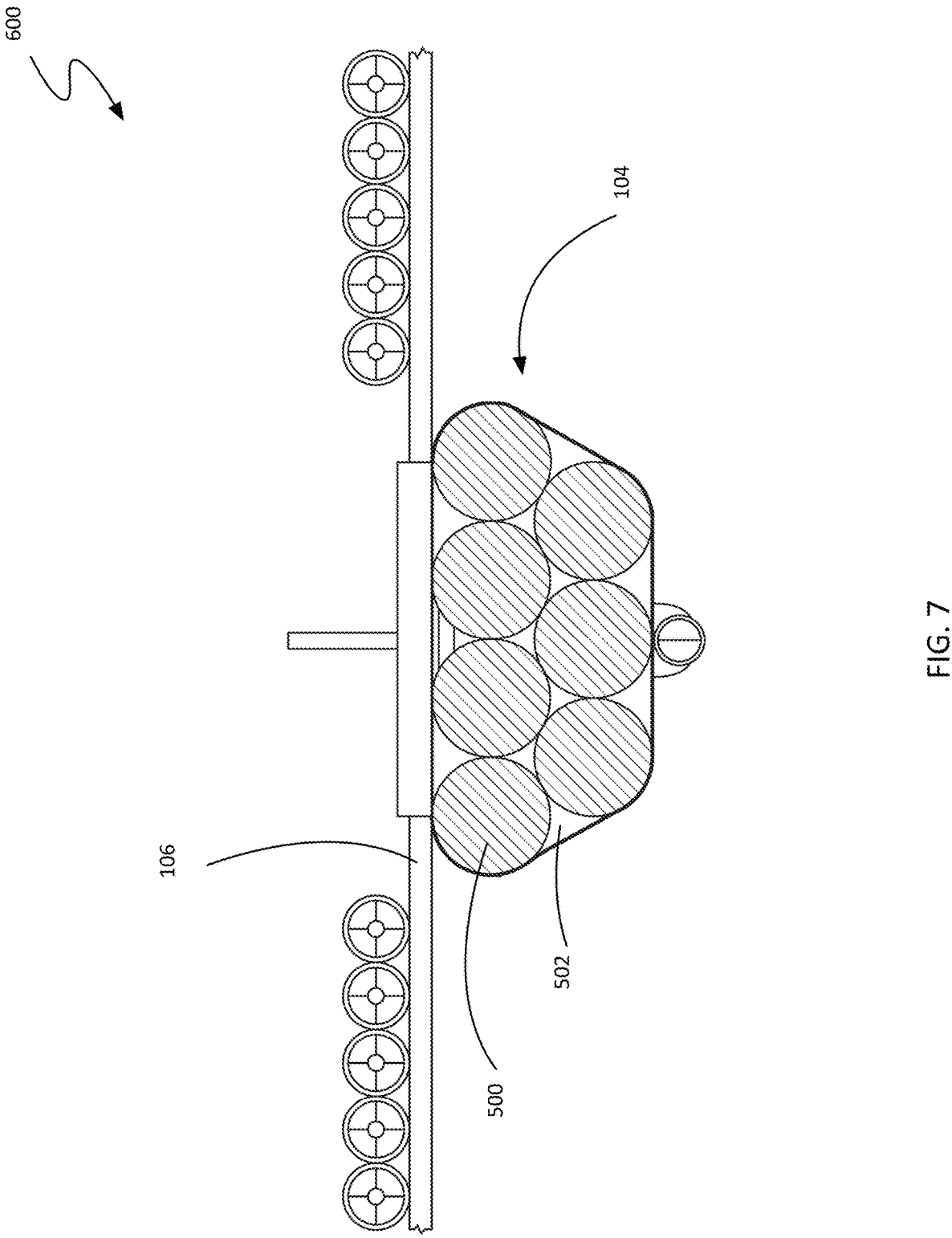
FIG. 7 is a cross-sectional view of the $H_2UAV$ 100 of FIG. 6 along B-B.

FIG. 7 is a cross-sectional view of the H₂UAV 600 of FIG. 6, taken along B-B. As shown, this fuselage 104 does not have a conventional cross-section, which typically is ovoid. This allows the tanks 500 to make more efficient use of the volume 502 within the fuselage 104. In some embodiments, the skin on the fuselage 104 is simply reducing drag, with the tanks 500, which may be coupled to each other, providing the structural stability.

Figure 8:
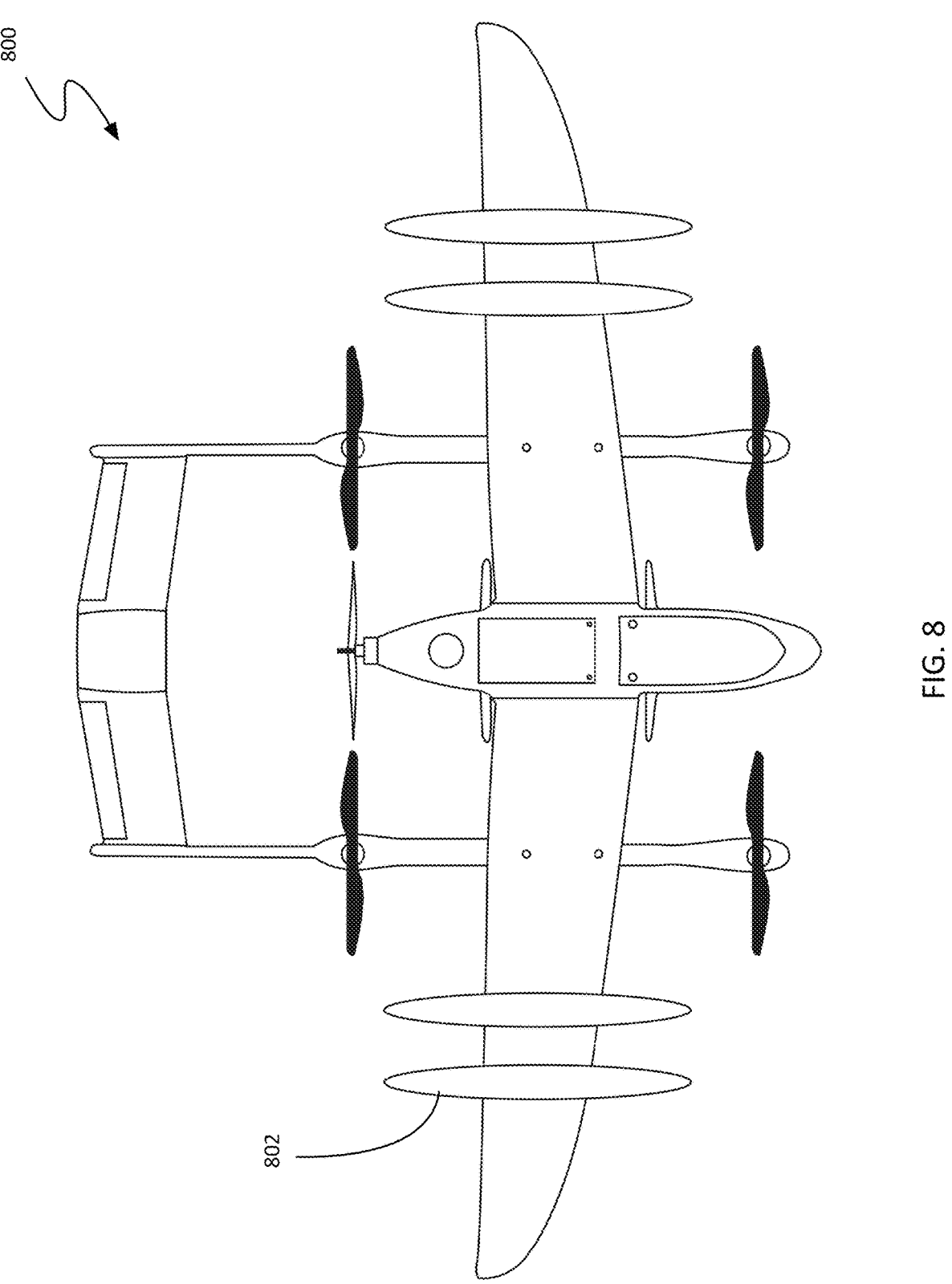
FIG. 8 is a bottom view of yet another embodiment of a $H_2UAV$ 100.

FIG. 8 is a bottom view of a non-limiting example of yet another embodiment of a H₂UAV 800. In some embodiments, the airframe 102 may be a simple, off-the-shelf UAV design, which may be adapted for use as a H₂UAV 800. As shown, a number of drop tanks 802 may be releasably coupled to the bottom of the H₂UAV 800 on under-wing pylons (not shown). While not as efficient for use in low-pressure hydrogen gas transport, adapting conventional UAVs to operate as a H₂UAV 800 contemplated herein is advantageous as it allows for the initiation of a supply line without the delay of manufacturing custom aircraft. Furthermore, conventional UAVs may be less expensive to create due to the economy of scale. This may ease the cost of the reduced efficiency in using such a design. This is another example of the potential low startup costs that will facilitate the adoption of hydrogen as a fuel source in more use cases.

Where the above examples, embodiments and implementations reference examples, it should be understood by those of ordinary skill in the art that other UAV and gas transportation devices and examples could be intermixed or substituted with those provided. In places where the description above refers to particular embodiments of a UAV for transporting low-pressure hydrogen, it should be readily apparent that a number of modifications may be made without departing from the spirit thereof and that these embodiments and implementations may be applied to other gas transportation technologies as well. Accordingly, the disclosed subject matter is intended to embrace all such alterations, modifications and variations that fall within the spirit and scope of the disclosure and the knowledge of one of ordinary skill in the art.

What is claimed is:

1. A method for transporting a gas with an unmanned aerial vehicle (UAV), comprising:

receiving and storing the gas within a gas reservoir of the UAV, the UAV comprising an airframe, a propulsion system, and a control system, with the airframe comprising a fuselage that encloses the gas reservoir, wherein the UAV comprises a box wing configured to serve as an undercarriage touching the ground when the UAV is on the ground, such that the UAV is supported in a vertical orientation and the box wing provides ground stability; and autonomously transporting the gas by operating the UAV with the control system and the propulsion system communicatively coupled to the control system, the propulsion system comprising at least one engine, with each of the at least one engine powered by energy derived from the gas stored in the gas reservoir, and with each of the at least one engine coupled to a prop having a rotational axis.

2. The method of claim 1:

wherein the fuselage encloses a volume, and wherein the gas reservoir fills at least a majority of the volume of the fuselage and is configured to receive and store the gas at a pressure no greater than 100 bar.

3. The method of claim 1, wherein the gas reservoir is configured to receive and store at least 100 kg of hydrogen gas.

4. The method of claim 1, further comprising:

dispensing the gas directly to at least one of an end-user equipment and an on-site storage while the UAV is on the ground;

wherein the UAV further comprises a gas interface in fluid communication with the gas reservoir; and wherein the gas is dispensed through the gas interface.

5. The method of claim 1, wherein the gas reservoir is configured to receive and store the gas at a pressure no greater than 30 bar.

6. The method of claim 1, wherein the gas is hydrogen gas.

7. The method of claim 1, wherein the UAV is a vertical take-off and landing (VTOL) aircraft.

8. The method of claim 1:

wherein the UAV comprises at least one wing that is rotatable and extendible, each wing of the at least one wing comprising a hinge, with the at least one engine of the propulsion system coupled to the at least one wing;

wherein autonomously transporting the gas comprises extending the at least one wing by articulating the hinge of the at least one wing during flight; and wherein autonomously transporting the gas further comprises rotating the at least one wing during flight such that the orientation of the rotational axis of each prop of the propulsion system, relative to the fuselage, changes.

9. The method of claim 1, further comprising:

landing the UAV on the ground;

wherein the UAV has a footprint while on the ground, and wherein the footprint of the UAV allows for delivery of the gas to be made to a gas station by the UAV using a preexisting parking lot of the gas station.

10. A method for transporting a gas with an unmanned aerial vehicle (UAV), comprising:

receiving and storing the gas within a gas reservoir of the UAV, the UAV comprising a fuselage, a box wing, a propulsion system, and a control system, with the fuselage being an airfoil enclosing a volume, and with the gas reservoir comprising a plurality of tanks in fluid communication and enclosed within the fuselage, filling at least a majority of the volume, wherein the box wing serves as an undercarriage touching the ground when the UAV is on the ground; and autonomously transporting the gas by operating the UAV with the control system and the propulsion system communicatively coupled to the control system, the propulsion system comprising a power generator and at least one engine, with each of the at least one engine powered by electricity generated by the power generator from the gas stored in the gas reservoir, and with each of the at least one engine coupled to a prop having a rotational axis;

wherein the power generator is in fluid communication with the gas reservoir and is communicatively coupled to the at least one engine.

11. The method of claim 10, wherein the gas reservoir is configured to receive and store the gas at a pressure no greater than 30 bar.

12. The method of claim 10, wherein the gas is hydrogen gas.

13. The method of claim 10, wherein the UAV is a vertical take-off and landing (VTOL) aircraft.

14. The method of claim 10:

wherein the fuselage is wider than long; and wherein the fuselage is pointed upward while the UAV is on the ground, and is pointed forward when the UAV is flying.

15. The method of claim 10, wherein all prop rotational axes are parallel and fixed with respect to the fuselage.

16. The method of claim 10, wherein the gas reservoir is configured to receive and store at least 100 kg of hydrogen gas.

17. The method of claim 10, further comprising:

dispensing the gas directly to at least one of an end-user equipment and an on-site storage while the UAV is on the ground;

wherein the UAV further comprises a gas interface in fluid communication with the gas reservoir; and wherein the gas is dispensed through the gas interface.

18. The method of claim 10, further comprising:

landing the UAV on the ground;

wherein the UAV has a footprint while on the ground, and wherein the footprint of the UAV allows for delivery of the gas to be made to a gas station by the UAV using a preexisting parking lot of the gas station.

\* \* \* \* \*